March 29, 1927.  
F. B. COCKBURN  
1,622,822  
UNIVERSAL FOLLOW REST  
Filed Feb. 21, 1924 2 Sheets-Sheet 1

Inventor  
Francis B. Cockburn  
By Wood & Wood  
Attorneys

March 29, 1927.
F. B. COCKBURN
1,622,822
UNIVERSAL FOLLOW REST
Filed Feb. 21, 1924  2 Sheets-Sheet 2
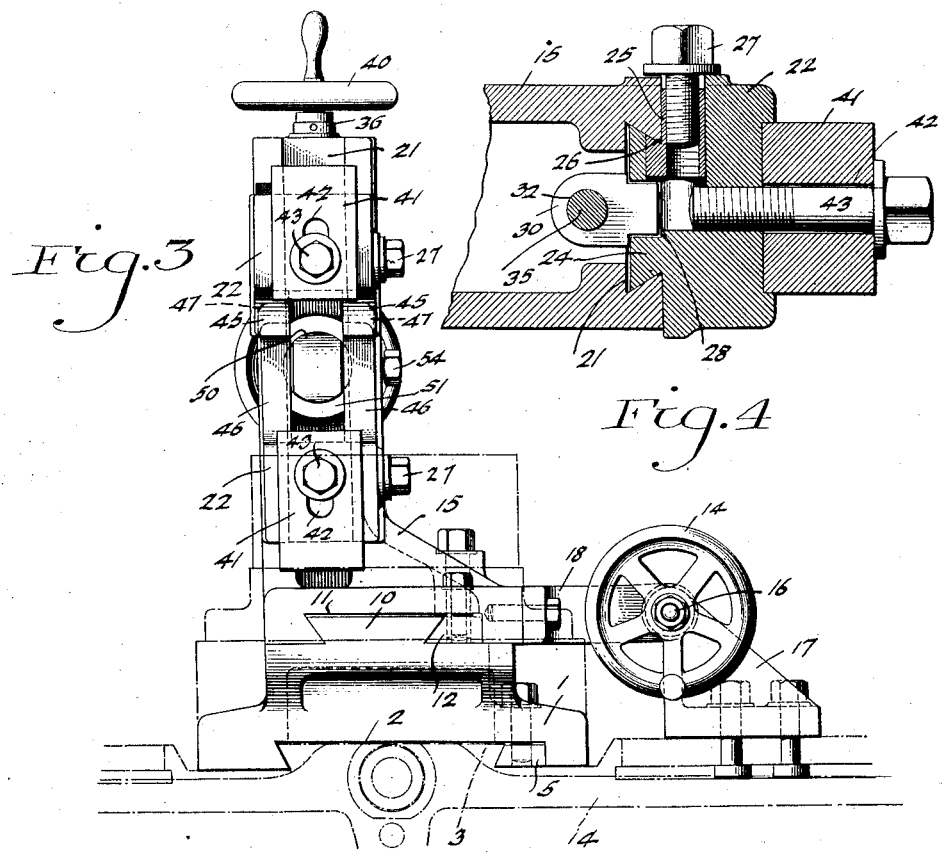
Fig.3
Fig.4
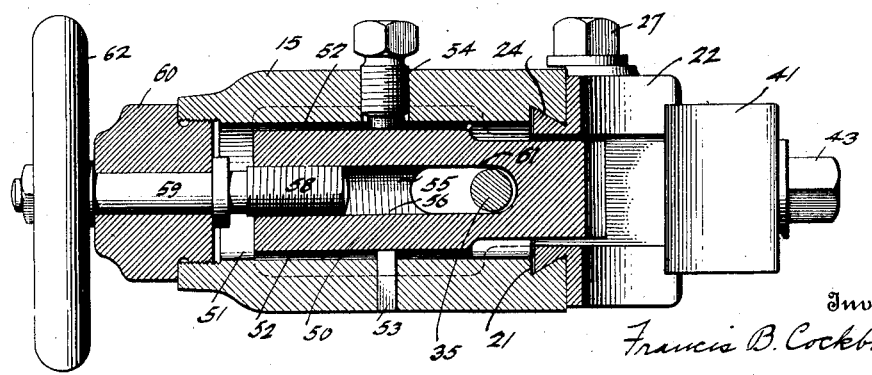
Fig.5
Inventor
Francis B. Cockburn
By Wood & Wood
Attorneys Patented Mar. 29, 1927.

1,622,822

UNITED STATES PATENT OFFICE.

FRANCIS BEAUFORT COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

UNIVERSAL FOLLOW REST.

Application filed February 21, 1924. Serial No. 694,218.

This invention relates to improvements, in follow-rests, adapted particularly for use in conjunction with engine lathes, for supporting the work between the work holding centers, but which can be used wherever it is desirable or necessary to brace the work, preserve alignment and prevent sagging or springing of same.

An object is to provide a rest movable as a whole along, toward and away from the work, and toward and away from the tool.

Another object is to provide a follow-rest in which the supporting jaws can be readily and accurately adjusted while the cutting operation is in progress, without danger of springing the work.

Another object is to provide a rest having means for bracing the work at three points, in planes at right angles to one another, which means includes a pair of jaws disposed at diametrically opposite sides of the work, and simultaneously adjustable relative to, and engageable with, the work, for preventing sagging or springing in a vertical plane, and a third jaw independently operable and engageable with the work midway of the points of engagement of said pair of simultaneously operable jaws, and at a point diametrically opposite to the tool, as a means for bracing the work against dis-alignment or springing in a horizontal plane, due to pressure or thrust of the tool.

Other objects are to provide a device of the character described, which is of simple, durable and sturdy construction, which can be manufactured at a minimum cost, and in which adjustment of the device and parts with reference to the work can be conveniently and quickly obtained.

The device is adapted to be mounted and adjustably secured upon a lathe carriage in opposition to the tool, and is further adapted to move along the work with the tool. The rest as a whole is movable toward and away from the tool and work by a single, hand operated screw shaft, and the pair of jaws, and the single intermediate jaw, are respectively adjustable by means of hand operated screw shafts.

Features and advantages will be disclosed in the description of the drawings forming a part of this specification and in said drawings:

Figure 3 is a front view with a portion of the lathe carriage shown in phantom lines.

Figure 4 is a horizontal detailed cross section on line 4—4, of Fig. 2.

Figure 5 is a detailed plan section on line 5—5, of Fig. 2.

Figure 2:
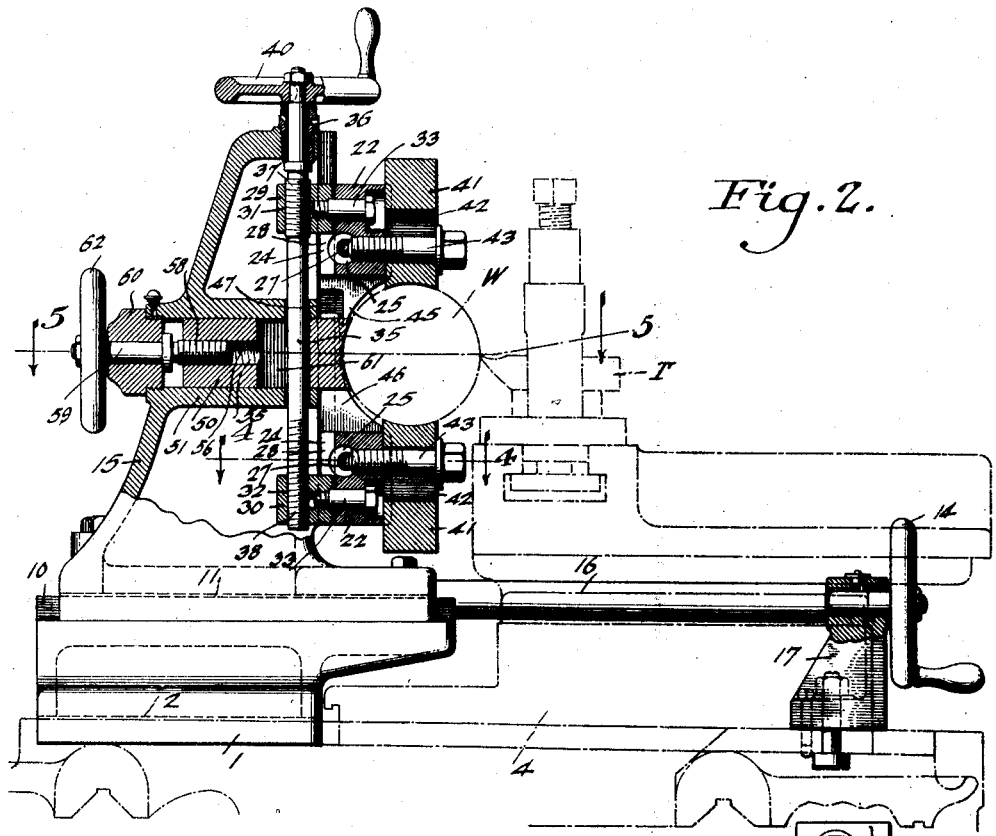
Figure 2 is a vertical longitudinal section on line 2—2, of Fig. 1, illustrating the application of the device, and portion of the lathe carriage with tool rest and tool being shown in phantom lines.
Figure 1:
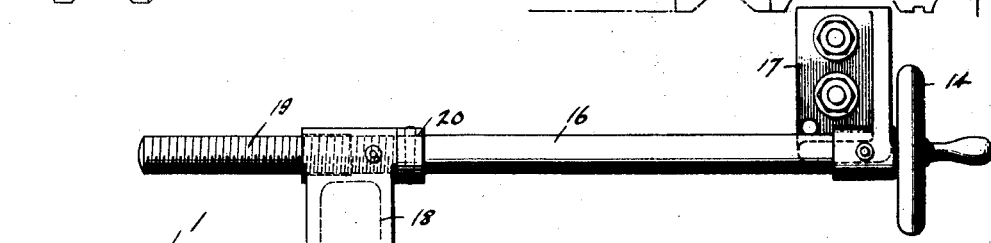
Figure 1 is a plan view of the rest.
Figure 1:
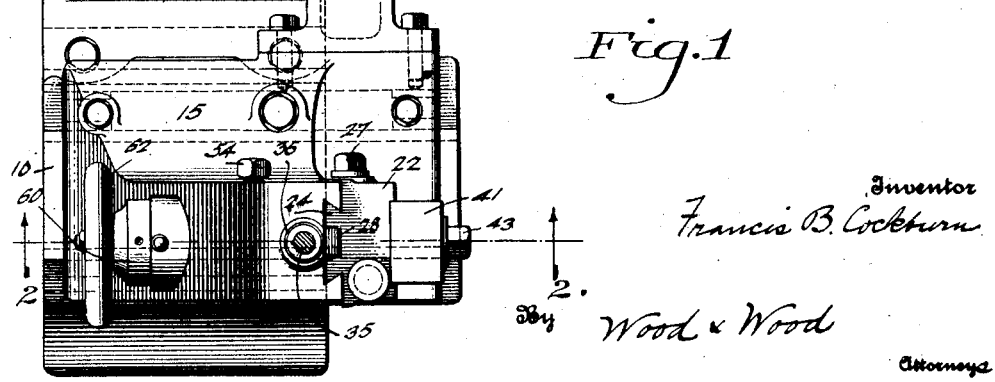

The device when used upon a lathe, wherein the work is sustained between the centers of the machine, is mounted upon the carriage to engage and support the work between the centers and at and opposite the cutting tool, and moving with the cutting tool. The supporting or resting of the work is accomplished by a plurality of jaws adjustable toward and from the work, for some classes of work two jaws disposed oppositely at an angle to one another are sufficient while for other instances it is desirable to provide three jaws, as two jaws oppositely disposed above and below the work and a third at one side in rear of the cutting tool. In the present instance the opposite jaws for bearing against the upper and lower side of the work are simultaneously or unitarily adjustable in opposing direction for centering purpose, with the frame supporting the jaws movable cross-wise of the work.

Referring to the drawings, the device has a rectangular base or slide rest 1, grooved as at 2, upon its bottom, adapting the base for attachment and adjustment upon a transversely disposed slide or way 3 of the lathe carriage 4, indicated in phantom lines, the base being further adapted by clamping gib 5, for locking in adjusted position. The base 1 is provided upon its top with a transversely disposed slide or way 10, parallel with the way 3, to which is translatably attached by means of groove 11 and screw operated gib 12, the lower portion of a frame or standard 15 extending above the level of the head and tail stock centers and supporting adjustable work-engaging jaws. The frame 15 is movable upon the base 1, toward and away from the work, indicated at "W" in phantom lines, by means of a hand-wheel operated screw shaft 16, non-translatably but rotatably supported at one end, in a bracket 17 detachably secured to the carriage 16 at its front side, upon the right hand wing, and at the opposite end in a bracket 18 extending horizontally from the side of the frame 15. The bracket 18 has a threaded opening, the threads of which are engaged with corresponding threads 19 at the end of the operating shaft 16. A collar 20 forms an abutment for limiting movement of the frame and aligning the work-engaging jaws with the center axis of the work. The front vertical face of the frame is grooved as at 21 throughout its length, and slidably attached within the groove are upper and lower jaws or jaw-carriers, simultaneously operable toward and away from one another and the work, to cause engagement and disengagement therewith of jaws adjustably mounted upon the carriers, said jaws adapted to engage the work at points above and below the same in diametrically opposite sides to prevent sagging or springing of the work in a vertical plane. The structure of each jaw, jaw-carrier or adjustable work-supporting unit, and the mode of attachment are substantially identical. Each jaw 22, is slidably engaged with the groove 21 in the frame 15, by means of a dove-tailed projection 24 (see Fig. 4). A clamp or gib 25 having a notch 26 engaged with one side of the groove 21, is provided, which clamp is translatable in the frame, and a clamping screw 27 tightens and holds the clamp and jaw-carrier in adjusted position. Attached to the jaw-carriers at the rear of and adjacent to their outer extremities and extending into vertical grooves 28, are upper and lower nuts respectively 29, 30, having bores 31, 32, respectively left and right threaded. The nuts 29, 30, are attached to the carrier by headed bolts 33.

Vertically disposed within the frame is a screw shaft 35 attached rotatably and non-translatably in a bushing 36, having threaded connection with the upper side of the frame. The shaft has left and right hand threads respectively 37, 38, engaged with the corresponding threads of the bores 31, 32. By means of the hand wheel 40 the shaft can be rotated to simultaneously bring the jaw-carriers toward or away from one another and the work. Mounted upon each jaw-carrier is an adjustable work-engaging member dished at one end for engagement with the work and having an elongated slot 42 traversed by the clamping screw 43. The jaws may have work-engaging end portions similar to the back jaw but it is preferable to have adjustable tool engaging members, detachably secured to the jaws or jaw-carriers, as herein shown and described. The members can thus be adjusted vertically upon the carriers, and are detachable. Each of the jaw-carriers has extensions or fingers respectively 45, 46, formed by slotting the inner ends of the carriers centrally and vertically, the slots thus formed being provided to permit traversal of the block or intermediate jaw, hereinafter described, for engagement with the work. The extensions are telescopically slidable one pair within the other, the width of the lower carrier being less than that of the upper, and the upper socketed as at 47 for reception of the lower extension when the jaws or jaw-carriers are brought toward one another. Each extension is circularly grooved at the front to provide clearance.

In frame 15 at a right angle to the axis of the vertically movable jaws, and on an axis intersecting the axis of the head and tail stock centers, is slidably and horizontally disposed a back jaw 50 designed to engage and prevent springing of the work, due to tool pressure, the tool being indicated in phantom lines at "T". The jaw 50 is circular in cross section and is held slidably and non-rotatively in a tubular bearing 51. To prevent rotation of the jaw in its bearing the same is longitudinally grooved at diametrically opposite sides as at 52, and engaged with the grooves are, a key, and adjustable set screw, respectively 53, 54. The jaw has a central bore 55 threaded as at 56, and engaged with these threads are corresponding threads 58 of a screw shaft 59 rotatably but non-translatably held in a bushing 60 having threaded connection with the frame 15. The jaw 50 is moreover provded with an elongated vertical slot 61, intersecting its central axis, the slot being loosely traversed by the screw shaft 35. The length of the slot 65 is sufficient to permit translation of the jaw forwardly for engagement of its outer dished end with the work, the inner end of the jaw being reduced to allow free translation of the same through the slot formed by the finger extensions of the jaw-carriers. A hand wheel 62 provides for rotation of the shaft 59. After adjusting, the jaw is locked by said screw 54.

The operation of the rest is as follows:

A piece of work having been positioned between head and tail stock centers, the jaws are opened and the carriage and rest moved to that point at which the cut is to begin, or to the rear of the machine. The cut is then started and when it has advanced sufficiently, the follow-rest is moved toward the work by operating the hand wheel 14, until the bracket 18 engages the abutment collar 20. The upper and lower jaws are then engaged with the work by operating the hand wheel 40, and the rear or back jaw is also advanced, and engaged, and all jaws thereafter locked by manipulating the screws 27, 54. When the cut is completed the jaws are retracted and the frame or rest moved rearwardly away from the work, to permit removal of said work. If duplicate pieces are to be turned it will be unnecessary to adjust the rear jaw inasmuch as the collar 20, acting as a stop, will accurately position the rest to bring the rear jaw in proper contact with the work. The work in some instances can be steadied sufficiently without the rear jaw, especially when the work is of small diameter or not subjected to severe cutting strains.

Having described my invention, I claim:

1. A follow rest for engine lathes in combination with a carriage, a slide rest adapted for mounting upon the cross slideway of the carriage, a standard slidably mounted upon said slide rest, a pair of opposing jaws vertically slidable upon said standard, a single screw journaled in said standard cooperating with said jaws for simultaneously adjusting said jaws in opposing directions, a jaw slidable in said standard transversely to said pair of jaws and disposed intermediate thereof, screw means journaled in said frame for adjusting said jaw, and a feed screw journaled on said carriage and engaged with said standard for moving said standard upon said slide rest, whereby the standard and jaws as a unit can be moved toward and from the work.

2. A follow rest for engine lathes in combination with a carriage, a slide rest adapted for mounting upon the cross slideway of the carriage, a standard slidably mounted upon said slide rest and provided with a vertical slideway, a pair of opposing jaw carriers mounted in said standard guide way, each carrier having a jaw adjustably mounted thereon, a screw journaled in said standard cooperating with said carriers for simultaneously adjusting the same in opposing directions, a jaw slidable in said standard and disposed intermediate thereof, screw means for adjusting said jaw and a feed screw journaled on said carriage and engaged with said standard for moving said standard upon said slide rest, whereby the standard and jaws as a unit can be moved toward and from the work.

In witness whereof, I hereunto subscribe my name.

FRANCIS BEAUFORT COCKBURN.